United States Patent [19]
Riviere et al.

[11] Patent Number: 5,900,041
[45] Date of Patent: May 4, 1999

[54] VALUE METAL RECOVERY

[75] Inventors: John Riviere, Beaconsfield; Jian Min Ren, St. Laurent, both of Canada

[73] Assignee: Metafix Inc., Montreal, Canada

[21] Appl. No.: 08/980,272

[22] Filed: Nov. 28, 1997

[51] Int. Cl.$^6$ .................................................. C22B 11/06
[52] U.S. Cl. .......................... 75/713; 75/733; 266/101; 266/170
[58] Field of Search ................... 266/101, 170; 75/733, 713

[56] References Cited

U.S. PATENT DOCUMENTS

| | | | |
|---|---|---|---|
| 4,325,732 | 4/1982 | Woog | 266/170 |
| 4,331,473 | 5/1982 | King, Jr. | 75/733 |
| 4,662,613 | 5/1987 | Woog | 266/170 |
| 4,842,644 | 6/1989 | Sneff | 75/733 |
| 5,026,029 | 6/1991 | Peterson | 266/170 |
| 5,173,247 | 12/1992 | Woog | 266/170 |
| 5,458,024 | 10/1995 | Schiller et al. | 75/733 |

FOREIGN PATENT DOCUMENTS

| | | | |
|---|---|---|---|
| 8905866 | 6/1989 | WIPO | 266/170 |

*Primary Examiner*—Scott Kastler
*Attorney, Agent, or Firm*—Swabey Ogilvy Renault

[57] ABSTRACT

Value metal, for example, silver in a spent silver bearing photographic solution is efficiently recovered in an exchange mass comprising a particulate inert substrate, for example, cellulosic fibers, synthetic fibers or sponge particles, co-mingled and interlocking with elongate particles of replacement metal, for example, strands of steel wool; the substrate defines a non-channeling random flow paths for liquid flow, and inhibits carriage of recovered value metal by the flowing liquid.

34 Claims, 3 Drawing Sheets

VALUE METAL RECOVERY

BACKGROUND OF THE INVENTION i) Field of the Invention

This invention relates to an exchange mass for recovery of a value metal from solution by reaction with a replacement metal; to a device housing such an exchange mass for such recovery; and to a method of such recovery.

ii) Description of Prior Art

It is desirable to recover value metals, for example, precious metals from otherwise waste or spent solutions containing them; by way of example, reference may be made to the recovery of silver from spent photographic solutions such as fixer solutions.

Silver recovery from used photoprocessing solutions by metallic replacement is carried out by using chemical recovery cartridges or metal replacement cartridges. Silver recovery by metal replacement is based on the fact that different chemical elements have different affinities for electrons. If a metal is in an elemental form and it has lower affinity for electrons, it will react with metals that are in ionic forms that have higher affinity for electrons. Iron has a lower affinity for electrons than silver, so upon contacting with photo processing solutions containing silver ions, iron metal will react with the silver ions. Iron metal becomes iron ions and enters solution while silver ions originally in the solution becomes silver metal. Iron is above silver in the electromotive force series. Some other metals will also work, such as aluminum and zinc. Iron in various forms is the most widely used because it is less expensive and more environmentally friendly.

Thus silver ion (in a complex form) is chemically reduced to silver metal by iron metal, and iron metal is chemically oxidized to iron ions in a metal replacement process.

Suitably the iron is supported in an elongate cartridge such as described by Woog in U.S. Pat. Nos. 4,662,613 and 4,325,732.

Different problems are encountered when metal replacement cartridges are used. The biggest problem is low efficiency in terms of iron usage. Theoretically, one gram of iron could recover 3.86 grams of silver (Fe, atomic weight, 55.847; Ag, atomic weight, 107.868; chemical reaction, $Fe+2Ag(I)=Fe(II)+2Ag$). In reality, most commercial cartridges have an efficiency of recovering 0.1 to 0.5 grams of silver per gram of iron in the cartridge. Part of the iron is consumed by the acid in the fixer. The more acidic the fixer, the lower the efficiency would be. However, the major cause of low efficiency is the so-called channeling phenomenon.

Channeling in a metal replacement cartridge occurs because of two reasons. Steel wool fibres tend to cluster together. Most manufacturing processes are not able to eliminate gaps between steel wool clusters or steel wool layers. Another reason is that silver ions and acids in the fixer react and consume steel wool, thus enlarging the fixer flow paths. Fixer will preferably flow through these gaps and paths so that the silver ions have less chance of reacting with steel wool, leading to high silver concentrations in the cartridge effluent. It is likely that a large portion of the initial steel wool in the MRC still remains when breakthrough point is reached.

SUMMARY OF THE INVENTION

It is an object of this invention to provide a device for recovery of a value metal from solution, more especially such a device which avoids the channeling problem.

It is a further object of this invention to provide an exchange mass for value metal recovery.

It is still a further object of this invention to provide a method for value metal recovery from a solution.

In one aspect of the invention there is provided a device for recovery of a value metal from a value metal bearing solution by reaction with a replacement metal above said value metal in the electromotive force series comprising: i) a housing having an inlet and an outlet separated by a flow chamber for a value metal bearing solution, ii) an exchange mass in said flow chamber between said inlet and said outlet, iii) said exchange mass comprising a particulate inert substrate co-mingled and interlocking with elongate replacement metal particles, iv) said particulate inert substrate defining non-channeling random flow paths for value metal bearing solution flowing between said inlet and said outlet in said flow chamber, and inhibiting carriage of recovered value metal by the flowing solution in said flow chamber.

In another aspect of the invention there is provided a method of recovering a value metal from a value metal bearing solution comprising: i) flowing a value metal bearing solution which comprises value metal ions in an aqueous vehicle, along random flow paths which extend through an exchange mass comprising a particulate inert substrate co-mingled and interlocking with elongate particles of replacement metal, said replacement metal being above said value metal in the electromotive force series, ii) contacting said value metal bearing solution with said elongate particles of replacement metal in said exchange mass, with entry of replacement metal ions into solution in the aqueous vehicle and reduction of said value metal ions to solid value metal recovered in said exchange mass, and iii) discharging a replacement metal bearing solution from said exchange mass, while said substrate inhibits carriage of the recovered value metal by the aqueous vehicle flowing along said flow paths.

In yet another aspect of the invention there is provided an exchange mass for recovery of silver by exchange with iron from a silver bearing solution comprising: a) a particulate inert substrate co-mingled with and interlocking with elongate, chopped steel wool particles, b) said substrate defining non-channelling random flow paths for flow of the silver bearing solution, and inhibiting carriage of recovered silver along said flow paths.

DESCRIPTION OF PREFERRED EMBODIMENTS i) Exchange Mass

The exchange mass comprises the replacement metal in elongate particle form and the particulate, inert substrate.

The substrate particles and the replacement metal particles are co-mingled and interlock with the metal particles dispersed throughout the mass of substrate particles.

The body of substrate particles retains its integrity and does not collapse, i.e., non-collapsing, as the replacement metal is consumed.

In forming a device such as a cartridge for recovery of silver metal from solution, the exchange mass is packed in the flow chamber of the cartridge to provide a packing in the cartridge which is permeable to the solution containing the silver ions. The compressible exchange mass is compressed in the flow chamber to provide a packing with a level of permeability to permit flow of the solution through the packing while providing a retention time of the solution in the packing to allow efficient replacement of silver ions in the solution by the replacement metal of the exchange mass.

If the degree of compression of the exchange mass is too great the resultant packed mass will not have sufficient permeability to liquid flow; if the mass is not compressed, or the compression is insufficient, there will be gaps in the mass so that the contact time is not sufficient to allow efficient replacement of silver ions and recovery of silver will not be achieved.

The exchange mass suitably comprises 70 to 99%, by weight, of the replacement metal particles and 1 to 30%, by weight of the substrate to a total of 100%, based on the weight of the exchange mass.

ii) Substrate

Suitable inert, particulate substrates include cellulosic fibers synthetic fibers and particles of synthetic or natural sponge.

Suitable cellulosic fibers include cellulosic paper fiber. Such fiber may be virgin paper fiber or may be recycled paper fiber derived from the recycling of paper products. Suitable synthetic fibers include polyethylene, polyester and polyamide, for example, nylon fibers.

The fibers typically are present in a random non-aligned arrangement, rendering the mass of fibers porous or permeable to liquid flow, the mass of fibers providing random flow paths for flow of the liquid. The permeability or porosity of the exchange mass may be adjusted by the relative ratio of the components and by compression of the mass.

Suitable sponge material includes synthetic compressible sponges, for example, polyurethane sponge, in a particle form in which the sponge is shredded or chopped into small portions while retaining the sponge structure which is characterized by a plurality of open pores or cells. As in the case of the fibers random flow paths are formed between the particles of sponge and between the open cells in the sponge and the permeability of the mass of sponge particles can be adjusted by the relative ratio of the components and an appropriate level of compression.

iii) Replacement Metal

The particles of replacement metal may be of any metal which is higher in the electromotive force series than the value metal which is to be recovered. In the case where the value metal is silver, iron or steel is suitably employed as the replacement metal.

Steel wool in a chopped form which results in elongate particles or strands is especially suitable for replacement of silver ions.

Suitable elongate steel wool strands have an average diameter of 0.1 to 0.2 mm, preferably 0.125 to 0.175 mm, and an average length of 3 to 7 mm, preferably about 5 mm. These strands may be relatively straight, arcuately curved or curled.

iv) Cartridge

The device or cartridge includes a housing having an inlet and outlet separated by a flow chamber.

The exchange mass is housed in the flow chamber.

Suitably the inlet and outlet are remotely spaced apart to define an elongate flow chamber for passage of liquid. The exchange mass packs the flow chamber so that all of the liquid entering the cartridge at the inlet must pass through the exchange mass to reach the outlet.

The solution entering the flow chamber from the inlet contains ions of the value metal, for example, silver. As the solution flows along the random flow paths defined in the exchange mass, replacement metal, for example, iron enters the solution and silver is recovered from the solution.

The solution entering the inlet in the case of photographic silver solutions, typically contains 1500 to 4000 ppm of silver; as the solution progresses in its travel through the exchange mass, the silver content diminishes, being replaced by iron, until the solution reaching the outlet has a silver content of no more than about 5 ppm, and contains iron in place of the original silver; and this iron-containing solution is discharged from the outlet.

The value metal bearing solution contains the value metal, for example, silver, as ions in an aqueous vehicle which may contain other chemicals derived from or employed in the original solution, for example, photographic chemicals.

Efficient replacement of value metal in solution is achieved in cartridges in which the flow chamber has a volume of 4,000 to 16,000 ml, employing a flow rate of solution of 100 to 125 ml/min. In general the flow rate may be 0.025 to 10,000 ml/min., preferably 1,000 to 3,000, more preferably about 2,000 ml/min. Efficient replacement has been achieved at a flow rate of 2,000 ml/min. which represents an especially practical flow rate.

Conveniently the cartridges may have flow chambers with a length:diameter ratio of 2:1 to 10:1. The cartridges are conveniently disposed vertically and the solution may be pumped into the cartridges or flow through the cartridges by gravity.

Employing the exchange mass of the invention in the cartridge achieved, in specific trials, silver recovery determined as the ratio of silver metal recovered to steel in the initial mass are 0.75 to 1.32, i.e., 0.75 to 1.32 g of Ag per 1 g of Fe, which represents a marked improvement in efficiency as compared with prior commercial cartridges.

In operation the silver content of the solution discharged from the outlet is monitored as a means of determining when the replacement iron is spent, or diminished to an extent that efficient replacement of the silver ions is no longer achieved. Typically the cartridge is employed until the silver content of the discharge solution reaches a threshold of 5 ppm. When this threshold value is reached flow of value metal bearing solution through the cartridge is discontinued.

The cartridge housing is suitably a disposable item of plastic material. Conveniently the spent cartridge with its charge of precipitated silver is delivered to a smelting furnace where the cartridge and the substrate packing are thermally destroyed to leave molten silver which is received from the furnace.

DESCRIPTION OF PREFERRED
EMBODIMENTS WITH REFERENCE TO THE
DRAWINGS

Figures 1, 1A:
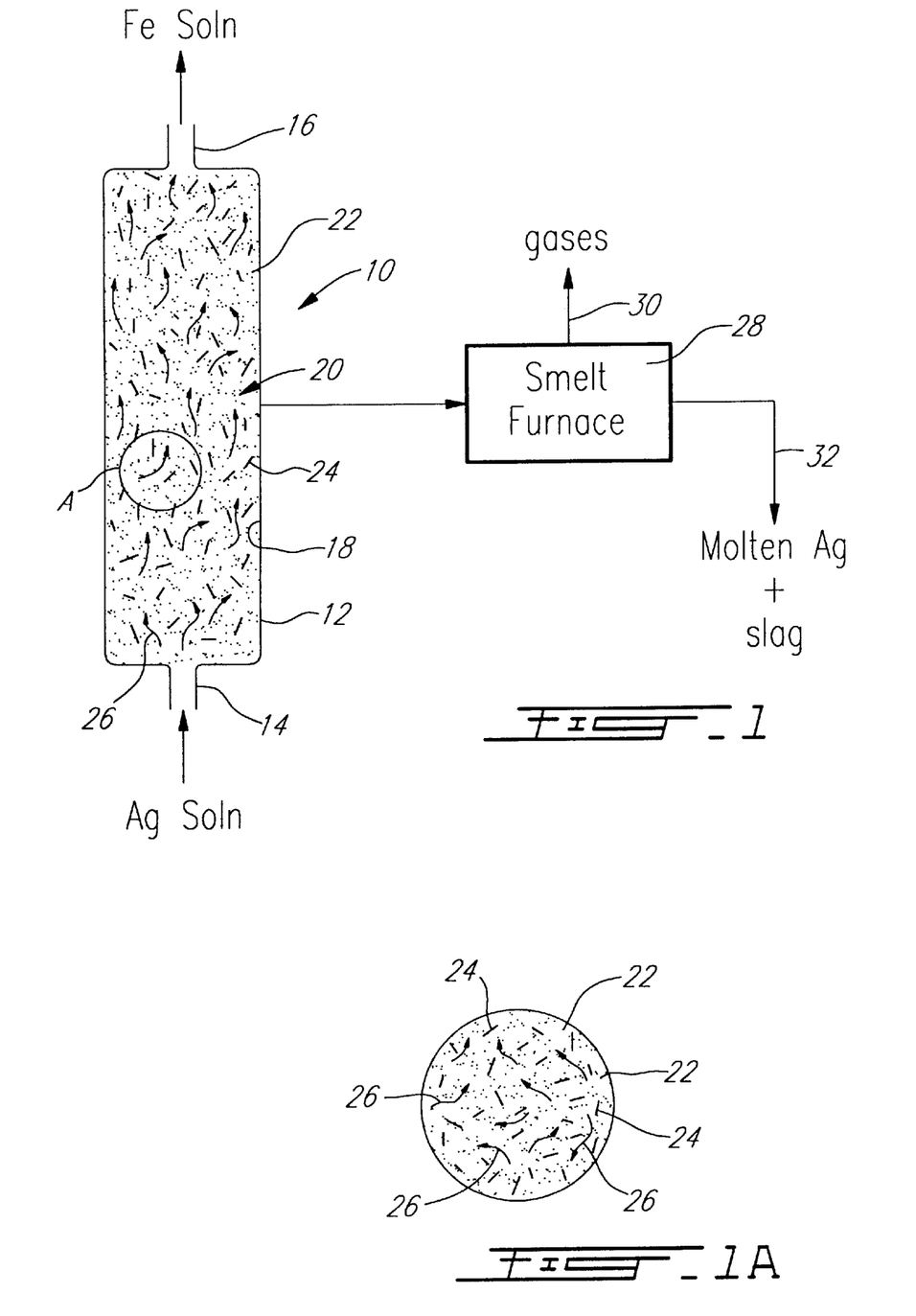
FIG. 1 is a schematic representation of the process of the invention.
FIG. 1A is a detail of the exchange mass in FIG. 1.

With further reference to FIG. 1, a cartridge 10 comprises a plastic housing 12 having an inlet 14 and an outlet 16 with a flow chamber 18 therebetween.

Flow chamber 18 is packed with an exchange mass 20, which is partially compressed.

Exchange mass 20 comprises fibrous cellulosic paper fibers 22 co-mingled with strands 24 of steel wool; the strands 24 and the paper fibres 22 interlock and the strands 24 are dispersed throughout the fibers 22.

Random flow paths for flow of liquid are identified by arrows 26.

A smelt furnace 28 has a gas outlet 30 and a molten silver outlet 32.

Detail A in FIG. 1 is shown in FIG. 1A.

Silver bearing photographic solution is fed under pressure through inlet 14 into flow chamber 18 where it encounters exchange mass 20 which is permeable to liquid. The solution flows along the flow paths identified by arrows 26 through exchange mass 22 where it contacts the strands 24 and replacement of silver ions by iron occurs with recovery of silver and formation of iron ions which travel with the solution as it continues its flow towards outlet 16.

The recovered silver is trapped between the fibers 22 which inhibit carriage of the silver by the solution flowing along the flow paths.

The flow paths may be considered as a multitude of separate flow paths which repeatedly join and separate, branching out throughout the exchange mass so that the solution follows a tortuous path through the exchange mass. The tortuous path also serves to inhibit carriage of the recovered silver by the flowing solution.

In the case where the fibers 22 are replaced by particulate sponge the open cells of the surface of the sponge particles, serve to trap recovered silver which then provides anchor sites for further recovered silver.

A solution which is substantially depleted in silver ions but which bears iron ions is discharged from outlet 16 of cartridge 10.

When the cartridge 10 is spent by the depletion of strands 24, the flow of solution is discontinued. At this stage cartridge 10 has a high charge or load of silver metal held in the mass of fibers 22. The mass of fibers 22 maintains its integrity throughout the process and does not collapse leaving voids or channels through which silver solution may escape contact with the strands 24.

The spent silver loaded cartridge 10 is delivered to smelt furnace 28 where the high temperature thermally destroys the plastic housing 12 and the fibers 22 to form gases which exit at outlet 30. Molten silver accumulates in furnace 28 with a slag and may be removed at outlet 32. Residual steel strands 24 in spent cartridge 10 may form a top layer of molten steel in furnace 28, if the temperature is sufficiently high, floating on the molten silver, or the residual strands 24 remain solid and float on top of the molten silver in the furnace.

EXAMPLE

Spent bleach-fixes and black/white fixers were collected from different sites. The silver concentration in the bleach-fix was between 1,500 ppm and 3,000 ppm with an average of 2,700 ppm, and the average pH of the bleach-fix was approximately 7. The average silver concentration of the black/white fixers was 3,500 ppm and the average pH was 5.2.

Trials were conducted employing three different cartridge housings identified as Col. A, Col. B and Col. C.

Col. A was made of transparent PVC (polyvinylchloride) tubing; Col. B and Col. C were polyethylene columns.

The physical dimensions are shown in Table I.

TABLE I

| | Physical Dimensions of columns | | | |
|---|---|---|---|---|
| | Diam. (cm) | Length (cm) | Length/diam | Vol. (ml) |
| Col. A | 3.8 | 32 | 8.42 | 365 |
| Col. B | 8.89 | 76.2 | 8.57 | 4729 |
| Col. C | 21.3 | 43.4 | 2.04 | 15489 |

Test Procedure

Two different grades of steel wool were used; steel wool Grade #2 (sw2, average diameter 0.125 mm, average length 5 mm) and Grade #3 (sw3, average diameter 0.175 mm, average length 5 mm). The steel wool was mixed with different amounts of an inert substrate (i.e., sponge or recycled paper fibre) and the mixture was packed in the cartridges. Either bleach-fix or black/white fixer was passed through these cartridges at controlled flow rates. The flow rate through Col. A was at 20 ml/min. while that for Cols. B and C is at 100–125 ml/min. Samples from effluents of these cartridges were analyzed periodically by atomic absorption spectrophotometer (AA) and the tests were stopped if the silver concentration in the effluent reached the breakthrough point.

Definition of Breakthrough Point

The breakthrough point of a cartridge is defined as the volume of fixers having passed through the cartridge when the silver concentration in the effluent from the column reaches 5 ppm or higher. Five ppm is the silver discharge limit allowed by most municipalities. The breakthrough point varies depending on the type of the fixer, the acidity or pH of the fixer and the silver concentration in the fixer. Commercially 1000 ppm (1 gram of silver per liter) is often used as the exhaustion point as indicated by silver testing paper.

After the breakthrough point of a cartridge, the cartridge may still have capacity to recover silver. However, the silver concentration in the effluent will be higher than 5 ppm.

Definition of Cartridge Efficiency

The cartridge efficiency is defined as the silver weight in a cartridge at breakthrough point divided by the initial iron weight in the cartridge abbreviated as Ag/Fe. It is used to compare cartridge performance under different conditions. Instead of silver weight, the volume of fixer passing through a cartridge at breakthrough point could be used as a criterion for cartridge efficiency but it would vary depending on the silver concentration in the fixer.

RESULTS AND DISCUSSION

To reduce channeling problems with the cartridges, inert, liquid permeable materials are mixed with steel wool. The inert materials force the fixer to flow in random paths inside the cartridge and prevent the core from collapsing when the steel wool is consumed.

Sponge and paper fibre were tested as the inert, porous material. Their ratio to steel wool was optimized.

Col. A

Due to the large fixer volumes that full size cartridges could pass, Col. A (small sized column) is used to optimize the type and amount of inert material to be added to steel wool.

Bleach-Fix—Col. A Tests

Table 2 shows the results with steel wool and different amounts of sponge for bleach-fix. From Table 2 it can be seen that if no sponge is added, one gram of iron recovers only 0.31 grams of silver. The cartridge efficiency is 0.31. Addition of sponge increases cartridge efficiency and the increase depends on the amount of sponge added. The highest efficiency is 1.18 grams of silver recovered per gram of iron, a 3.8 time increase compared to absence of sponge.

TABLE 2

Bleach-fix - mini column - steel wool and sponge mixture

| sw2 (g) | 135 | 135 | 135 | 135 | 135 | 170 |
|---|---|---|---|---|---|---|
| sponge (g) | 0 | 13 | 21 | 32 | 43 | 43 |
| Ag recovered (g) | 42 | 101 | 144 | 159 | 147 | 145 |
| Ag/Fe | 0.31 | 0.75 | 1.07 | 1.18 | 1.09 | 0.85 |

Similarly, Table 3 shows the results with steel wool mixed with different amounts of recycled paper fibre for bleach-fix. It can be seen that the highest efficiency with paper fibre is 1.32, a 4.2 times increase compared to steel wool alone (see Table 2).

TABLE 3

Bleach-fix - Col. A - steel wood and paper fibre mixture

| sw2 (g) | 108 | 108 | 108 | 154 | 77 | 154 | 200 | 200 |
|---|---|---|---|---|---|---|---|---|
| fibre (g) | 8 | 12 | 17 | 12 | 23 | 8 | 8 | 12 |
| Ag recovered (g) | 90 | 113 | 107 | 171 | 78 | 203 | 229 | 252 |
| Ag/Fe | 0.83 | 1.05 | 0.99 | 1.11 | 1.02 | 1.32 | 1.15 | 1.26 |

Black/White Fixer—Col. A

The results for black/white fixer (pH 5.2) are shown in Table 4. Addition of fibre increases the efficiency of silver recovery per gram of iron from 0.45 to 0.82, a 1.8 times increase.

TABLE 4

Black/white Fixer - Col. A - steel wool and paper fibre mixture

| swa3 (g) | 150 | 150 | 150 | 150 | 200 |
|---|---|---|---|---|---|
| fibre (g) | 0 | 13 | 17 | 24 | 17 |
| Ag recovered (g) | 67 | 122 | 110 | 102 | 99 |
| Ag/Fe | 0.45 | 0.82 | 0.73 | 0.68 | 0.50 |

Full Size Cartridge Tests

The media showing the highest efficiency in Col. A tests were placed in full size cartridges, with the ratio of steel wool and the inert material being the same and the total weight being proportional to the volume of the cartridge.

Bleach-Fix—Full Size Cartridge Tests

Table 5 shows the results with Col. B with steel wool and sponge mixture. Included in Table 5 are silver concentrations in the effluent when different volumes of bleach-fix are passed and the corresponding silver weight in the cartridge. The cartridge efficiency is 1.41.

TABLE 5

Bleach-fix - 10-2-1 - steel wool and sponge mixture

| Ag ppm | 0.1 | 0.2 | 0.3 | 0.9 | 1 | 1.9 | 5.5 |
|---|---|---|---|---|---|---|---|
| Vol. (L) | 20 | 158 | 300 | 350 | 450 | 640 | 681 |
| Ag recovered (g) | 58 | 458.2 | 870 | 1015 | 1305 | 1856 | 1974.9 |
| Ag/Fe | | | | | | | 1.41 |

Similarly, Table 6 shows the test results with Col. C filled with the same steel wool and sponge mixture. The total bleach-fix volume passed is 445 liters and the silver recovery efficiency per gram of iron is only 0.19. In this test, the steel wool/sponge ratio in the mixture is the one having highest efficiency in the Col. A tests (Table 2). However, difficulty is encountered when the mixture is packed into Col. C due to large initial/final volume compression ratio. In order to minimize this packing difficulty, the total weight of the mixture was reduced to 80% of what it should be if it were to be proportional to the volume ratio in Col. C and Col. A. For all the remaining tests the mixture used was proportional to the volume ratio between the full cartridges Cols. B and C and the mini trial cartridge, Col. A.

TABLE 6

Bleach-fix - Col. C - steel wool and sponge mixture

| Ag ppm | 1.5 | 4 | 7 | 12 |
|---|---|---|---|---|
| Vol. (L) | 193 | 286 | 325 | 445 |
| Ag recovered (g) | 386 | 572 | 650 | 890 |
| Ag/Fe | | | | 0.19 |

In comparison to steel wool and sponge mixture, with steel wool and recycled paper fibre mixture, a cartridge efficiency of 1.37 is obtained with Col. B and 0.96 with Col. C, as shown in Table 7 and Table 8.

TABLE 7

Bleach-fix - Col. B - steel wool and paper fibre mixture

| Ag ppm | 0 | 0.7 | 1.1 | 1.2 | 0.7 | 0.7 | 0.6 | 1.6 | 3.6 |
|---|---|---|---|---|---|---|---|---|---|
| Vol. (L) | 0 | 456 | 612 | 662 | 821 | 931 | 987 | 1003 | 101 |
| Ag recovered (g) | 0 | 1231 | 1652 | 1787 | 2217 | 2513 | 2665 | 2708 | 275 |
| Ag/Fe | | | | | | | | | 1.37 |

TABLE 8

Bleach-fix - Col. C - steel wool and paper fibre mixture

| Ag (ppm) | 0 | 0.6 | 0.6 | 0.8 | 0.6 | 0.8 | 0.7 | 0.7 |
|---|---|---|---|---|---|---|---|---|
| Vol. (L) | 0 | 642 | 692 | 719 | 924 | 1046 | 1099 | 1574 |
| Ag recovered (g) | 0 | 1733 | 1869 | 1941 | 2496 | 2824 | 2968 | 4250 |
| Ag (ppm) | 0.8 | 0.7 | 0.7 | 0.9 | 1 | 1.1 | 2.1 | 8 |
| Vol. (L) | 1731 | 1903 | 1956 | 2070 | 2128 | 2241 | 2300 | 2334 |
| Ag recovered (g) | 4675 | 5137 | 5282 | 5590 | 5744 | 6052 | 6200 | 6301 |
| Ag/Fe | | | | | | | | 0.96 |

Figure 2:
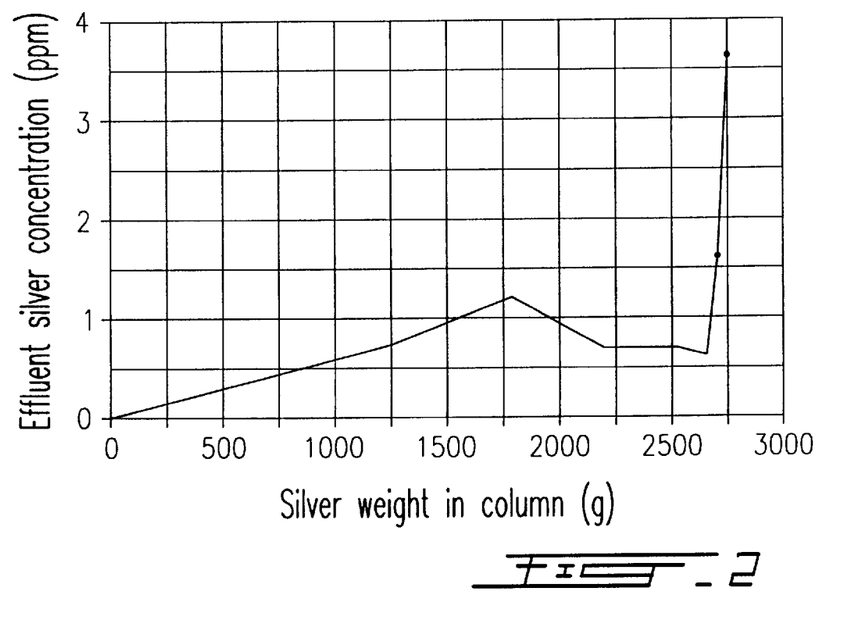
FIG. 2 is a graphical plot of effluent silver concentration vs. silver weight in a cartridge of the invention for bleach fix.
Figure 3:
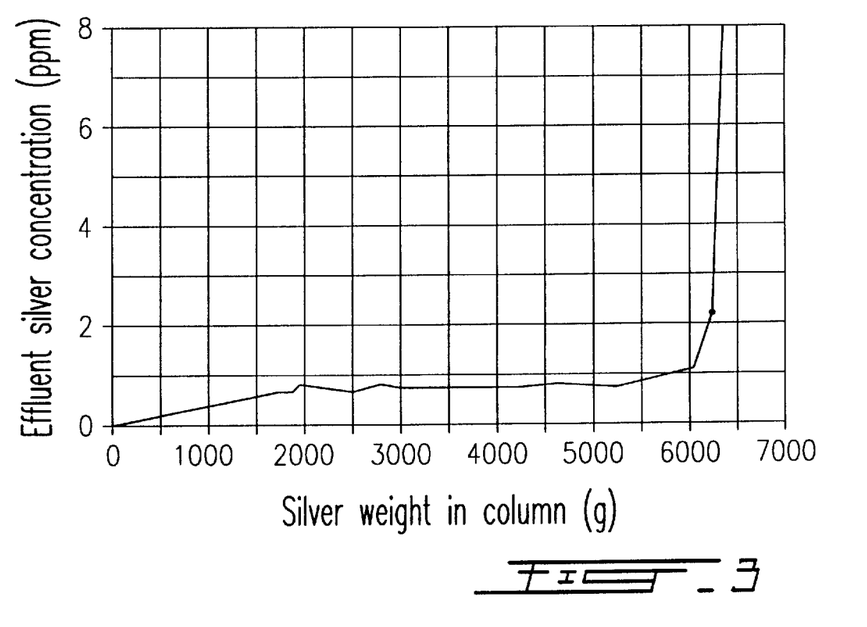
FIG. 3 is a plot similar to FIG. 2 for a different cartridge of the invention.

FIGS. 2 and 3 show the effluent silver concentration versus silver weight in Col. B and Col. C for bleach-fix. The silver concentration in the effluent is below 1 ppm for most of the lifetime of the cartridges, with a very sharp increase at the end. It means that cartridges filled with this steel wool and paper fibre mixture easily meet silver discharge regulations imposed by most municipalities.

Black/White Fixer—Full Size Cartridge Tests

With Col. B filled with steel wool and sponge mixture, the efficiency is only 0.36 gram of silver per gram of iron, as shown in Table 9.

TABLE 9

Black/White fixer (pH 4.77 - Col. B - steel wool and sponge mixture

| Ag ppm | 1.6 | 2 | 2.5 | 2.6 | 9 |
|---|---|---|---|---|---|
| Vol. (L) | 10 | 56 | 140 | 188 | 300 |
| Ag recovered (g) | 17 | 95 | 238 | 320 | 510 |
| Ag/Fe | | | | | 0.36 |

With steel wool and paper fibre mixture, and pH 5.2 black/white fixer, Col. B performs better than steel wool and sponge mixture, as shown in Table 10. Effluent silver level reaches 5 ppm breakthrough point when 1 gram of silver is recovered by 1 gram of iron.

TABLE 10

Black/White Fixer - Col. B - steel wool and paper fibre mixture

| Ag ppm | 0 | 2.5 | 3.7 | 5.4 |
|---|---|---|---|---|
| Vol. (L) | 0 | 129 | 318 | 474 |
| Ag recovered (g) | 0 | 464 | 1316 | 2016 |
| Ag/Fe | | | | 1.01 |

Col. C recovers 1 gram of silver per gram of iron before the silver level in the effluent reaches 5 ppm breakthrough point (when the total silver recovered by the cartridge is 6.55 kg), as shown in Table 11.

TABLE 11

Black/White Fixer - Col. C - steel wool and paper fibre mixture

| Ag ppm | 0 | 1.5 | 2 | 2 | 5 | 3.6 | 3.8 |
|---|---|---|---|---|---|---|---|
| Vol. (L) | 0 | 134 | 345 | 515 | 716 | 1264 | 1309 |
| Ag recovered (g) | 0 | 482 | 1430 | 2198 | 3099 | 5566 | 5770 |
| Ag ppm | 4.1 | 4.1 | | | | | |
| Vol.(L) | 1430 | 1483 | | | | | |
| Ag recovered (g) | 6314 | 6552 | | | | | |
| Ag/Fe | | 1.00 | | | | | |

Figure 4:
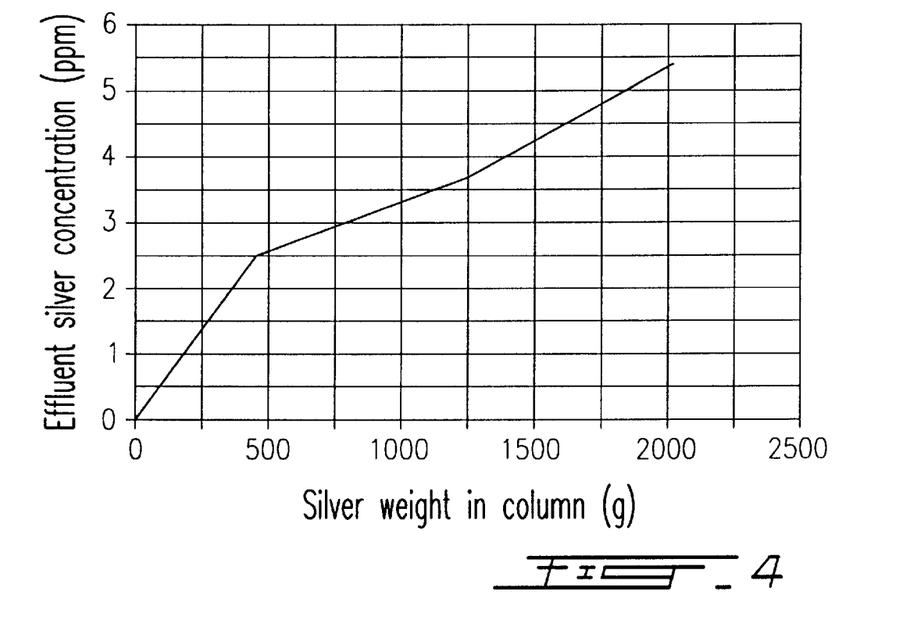
FIG. 4 is a graphical plot of effluent silver concentration vs. silver weight in a cartridge of the invention for black/white fixer.
Figure 5:
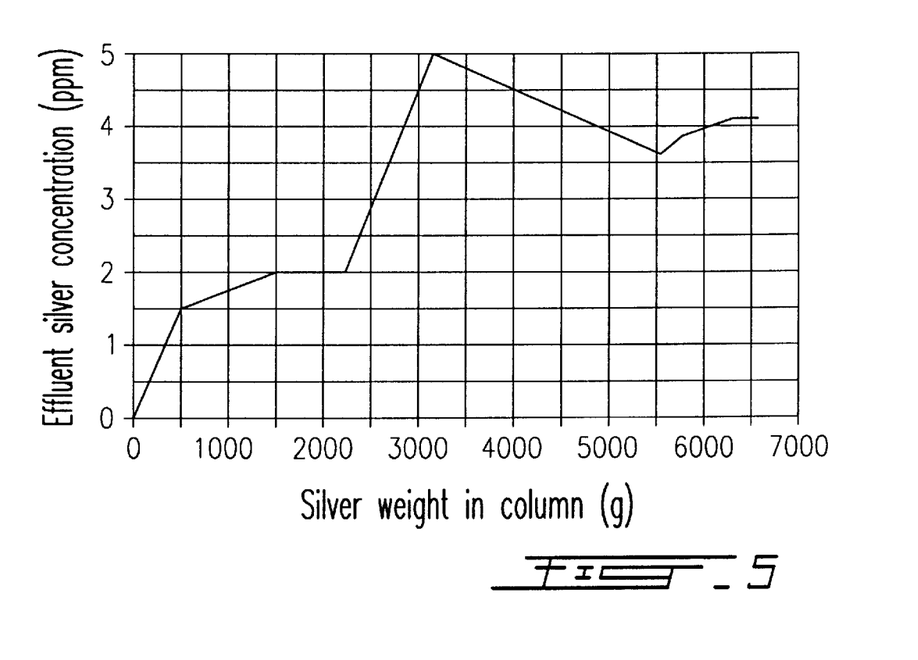
FIG. 5 is a plot similar to FIG. 4 for a different cartridge of the invention.

FIGS. 4 and 5 are graphical representations of Tables 10 and 11. Compared to FIGS. 2 and 3 for bleached-fix, the effluent silver concentration is between 1 and 5 ppm for most of the lifetime of the cartridges.

Tables 12 and 13 compare cartridge performance with the addition of sponge and recycled paper fibre. From Tables 12 and 13 it can be seen that, generally, the addition of sponge or fibre improves cartridge efficiency, with the fibre performing better than the sponge. Tests are not done under exactly the same conditions, however, so the Tables can only be used as a general guideline.

TABLE 12

Effect of sponge and fibre addition - Bleach-fix

| | no addition | sponge | fibre |
|---|---|---|---|
| Col. A | 0.31 | 1.18 | 1.32 |
| Col. B | N/A | 1.41 | 1.37 |
| Col. C | N/A | 0.19 | 0.96 |

TABLE 13

Effect of sponge and fibre addition - Black/White Fixer

| | no addition | sponge | fibre |
|---|---|---|---|
| Col. A | 0.45 | N/A | 0.82 |
| Col. B | N/A | 0.36 | 1.01 |
| Col. C | N/A | N/A | 1.00 |

From the Tables it can be seen that Col. B tends to have higher efficiency than Col. C indicating that the physical dimensions of the cartridge may affect performance. Larger height-to-diameter ratio is usually preferred, which is consistent with chromatography theory.

A moving silver band is observed in the cartridges tested for bleach-fix. Silver metal recovered by steel wool is dissolved back in solution by ferric-EDTA in the bleach-fix and this re-dissolved silver is recovered by steel wool downstream. Thus the silver band moves towards the outlet.

Since Cols. B and C have reasonably large silver recovery capacities (2.7 kg and 6.3 kg of silver respectively), and the effluent silver concentration is below 5 ppm for most of the cartridge lifetime, it is not necessary to use two cartridges in series which is a common practice. Two cartridges in series are recommended by most manufacturers because the media in the cartridges is not efficient enough to reduce the silver concentration in the effluent to meet discharge limits. Two cartridges are used to provide a safety factor. However, the second cartridge does not contain much silver. In the case of black/white fixer, due to long contact time between the medium and the fixer, the second cartridge may lose some silver recovery capacity, leading to higher cost. The new medium of the invention represents a substantial cost saving.

Smelting of Used Cartridges

The spent cartridges contain 50% or more of silver (dry weight). Addition of flux is optional when the cartridges are smelted. The smelting time is less than 30 minutes in a crucible placed in an air-natural gas flame. The silver recovered is approximately 95% of the theoretical value.

The addition of sponge or fibre is believed to improve cartridge performance by 1. the inert filling material such as recycled paper fibre or sponge, forces the solution to flow in a random pattern, dramatically reducing or eliminating the channeling problem existing in most commercially available cartridges;
2. the inert filling material is not consumed by the fixer. It provides a support for the core of the cartridge and prevents the core from collapsing;
3. the filling material acts as a filter or mini-filters and holds the silver particles in the column, avoiding the possibility of particles being entrained by the flowing solution and sewered.

The advantages of the new media include
1. lower silver concentration in the effluent (for bleach fix, <1 ppm vs. 1–5 ppm for other cartridges).
2. higher cartridge efficiency.
3. easy refining of the spent cartridges.

We claim:
1. A device for recovery of a value metal from a value metal bearing solution by reaction with a replacement metal above said value metal in the electromotive force series comprising:

i) a housing having an inlet and an outlet separated by a flow chamber for a value metal bearing solution, ii) an exchange mass in said flow chamber between said inlet and said outlet, iii) said exchange mass comprising a particulate inert substrate co-mingled and interlocking with elongate replacement metal particles, said particulate inert substrate being selected from cellulosic fibers, synthetic fibers or particles of sponge material, iv) said particulate inert substrate defining non-channelling random flow paths for value metal bearing solution flowing between said inlet and said outlet in said flow chamber, and inhibiting carriage of recovered value metal by the flowing solution in said flow chamber.

2. A device according to claim 1, wherein said particulate inert substrate comprises cellulosic fibres.

3. A device according to claim 1, wherein said particulate inert substrate is cellulosic paper fibers.

4. A device according to claim 3, wherein said fibers are recycled paper fibers.

5. A device according to claim 3, wherein said elongate replacement metal particles comprise chopped steel wool particles having an average diameter of 0.1 to 0.2 mm and an average length of 3 to 7 mm.

6. A device according to claim 4, wherein said elongate replacement metal particles comprise chopped steel wool particles having an average diameter of 0.125 to 0.175 mm and an average length of about 5 mm.

7. A device according to claim 1, wherein said particulate substrate comprises particles of sponge material.

8. A device according to claim 1, wherein said exchange mass comprises 70 to 99%, by weight, of said elongate replacement metal particles and 1 to 30%, by weight, of said substrate, to a total of 100%, based on the weight of the exchange mass.

9. A device according to claim 8 wherein said substrate comprises cellulosic paper fibers and said replacement metal particles are steel particles.

10. A device according to claim 1, wherein said housing is a plastic disposable housing.

11. An exchange mass for recovery of silver by exchange with iron from a silver bearing solution comprising:

a) a particulate inert substrate co-mingled with and interlocking with elongate, chopped steel wool particles, b) said substrate defining non-channelling random flow paths for flow of the silver bearing solution, and inhibiting carriage of recovered silver along said flow paths, said particulate inert substrate being selected from cellulosic fibers, synthetic fibers or particles of sponge material.

12. An exchange mass according to claim 11, wherein said substrate comprises cellulosic paper fibers.

13. An exchange mass according to claim 12, wherein said elongate, chopped steel wool particles have an average diameter of 0.1 to 0.2 mm and an average length of 3 to 7 mm, and comprising 1 to 30%, by weight, of said cellulosic paper fibers, and 70 to 99%, by weight, of said steel wool particles, to a total of 100%.

14. A method of recovering a value metal from a value metal bearing solution comprising:

i) flowing a value metal bearing solution which comprises value metal ions in an aqueous vehicle, along random flow paths which extend through an exchange mass comprising a particulate inert substrate co-mingled and interlocking with elongate particles of replacement metal, said replacement metal being above said value metal in the electromotive force series, and said particulate inert substrate being selected from cellulosic fibers, synthetic fibers or particles of sponge material, ii) contacting said value metal bearing solution with said elongate particles of replacement metal in said exchange mass, with entry of replacement metal ions into solution in the aqueous vehicle and reduction of said value metal ions to solid value metal recovered in said exchange mass, and iii) discharging a replacement metal bearing solution from said exchange mass, while said substrate inhibits carriage of the recovered value metal by the aqueous vehicle flowing along said flow paths.

15. A method according to claim 14, wherein said value metal ions are silver ions, said elongate particles of replacement metal comprise chopped steel wool particles having an average diameter of 0.1 to 0.2 mm and an average length of 3 to 7 mm and said substrate is cellulosic paper fibers; said exchange mass comprising 70 to 99%, by weight, of said chopped steel wool and 1 to 30%, by weight, of said cellulosic paper fibers, to a total of 100%, by weight, based on the weight of the exchange mass.

16. A method according to claim 15, wherein said silver ions in said solution in step i) are present in an amount of 1500 ppm to 4000 ppm and said solution discharged in step iii) has a content of silver ions of not more than 5 ppm.

17. A method according to claim 16, wherein said value metal bearing solution in step i) flows through said exchange mass at a flow rate of 0.025 to 10,000 ml/min.

18. A method according to claim 17, wherein said flow rate is 1000 to 3000 ml/min.

19. A device for recovery of a value metal from a value metal bearing solution by reaction with a replacement metal above said value metal in the electromotive force series comprising:

i) a housing having an inlet and an outlet separated by a flow chamber for a value metal bearing solution, ii) an exchange mass in said flow chamber between said inlet and said outlet, iii) said exchange mass comprising a particulate inert substrate co-mingled and interlocking with elongate replacement metal particles, comprising chopped steel wool particles having an average diameter of 0.1 to 0.2 mm and an average length of 3 to 7 mm, iv) said particulate inert substrate defining non-channelling random flow paths for value metal bearing solution flowing between said inlet and said outlet in said flow chamber, and inhibiting carriage of recovered value metal by the flowing solution in said flow chamber.

20. A device according to claim 19, wherein said particulate inert substrate comprises cellulosic fibers.

21. A device according to claim 19, wherein said particulate inert substrate is cellulosic paper fibers.

22. A device according to claim 21, wherein said fibers are recycled paper fibers.

23. A device according to claim 19, wherein said chopped steel wool particles have an average diameter of 0.125 to 0.175 mm and an average length of about 5 mm.

24. A device according to claim 19, wherein said particulate substrate comprises particles of sponge material.

25. A device according to claim 19, wherein said exchange mass comprises 70 to 99%, by weight, of said elongate replacement metal particles and 1 to 30%, by weight, of said substrate, to a total of 100%, based on the weight of the exchange mass.

26. A device according to claim 19, wherein said housing is a plastic disposable housing.

27. An exchange mass for recovery of silver by exchange with iron from a silver bearing solution comprising:

a) a particulate inert substrate co-mingled with an interlocking with elongate, chopped steel wool particles, having an average diameter of 0.1 to 0.2 mm and an average length of 3 to 7 mm, b) said substrate defining non-channelling random flow paths for flow of the silver bearing solution, and inhibiting carriage of recovered silver along said flow paths.

28. An exchange mass according to claim 27, wherein said substrate comprises cellulosic paper fibers.

29. An exchange mass according to claim 28, comprising 1 to 30%, by weight, of said cellulosic pulp fibers and 70 to 99%, by weight, of said steel wool particles, to a total of 100%.

30. A method of recovering a value metal from a value metal bearing solution comprising:

i) flowing a value metal bearing solution which comprises value metal ions in an aqueous vehicle, along random flow paths which extend through an exchange mass comprising a particulate inert substrate co-mingled and interlocking with elongate particles of replacement metal, said replacement metal being above said value metal in the electromotive force series, said replacement metal comprising chopped steel wool particles having an average diameter of 0.1 to 0.2 mm and an average length of 3 to 7 mm, ii) contacting said value metal bearing solution with said elongate particles of replacement metal in said exchange mass, with entry of replacement metal ions into solution in the aqueous vehicle and reduction of said value metal ions to solid value metal recovered in said exchange mass, and iii) discharging a replacement metal bearing solution from said exchange mass, while said substrate inhibits carriage of the recovered value metal by the aqueous vehicle flowing along said flow paths.

31. A method according to claim 30, wherein said value metal ions are silver ions, and said substrate is cellulosic paper fibers; said exchange mass comprising 70 to 99%, by weight, of said chopped steel wool and 1 to 30%, by weight, of said cellulosic paper fibers, to a total of 100%, by weight, based on the weight of the exchange mass.

32. A method according to claim 31, wherein said silver ions in said solution in step i) are present in an amount of 1500 ppm to 4000 ppm and said solution discharged in step iii) has a content of silver ions of not more than 5 ppm.

33. A method according to claim 32, wherein said value metal bearing solution in step i) flows through said exchange mass at a flow rate of 0.025 to 10,000 ml/min.

34. A method according to claim 33, wherein said flow rate is 1000 to 3000 ml/min.

* * * * *